(No Model.) 6 Sheets—Sheet 4.
J. T. RUSSELL.
HAY PRESS.

No. 508,843. Patented Nov. 14, 1893.

WITNESSES:
F. L. Durand
J. L. Coombs

INVENTOR:
John T. Russell,
by Louis Bagger & Co.
Attorneys.

THE NATIONAL LITHOGRAPHING COMPANY,
WASHINGTON, D. C.

(No Model.)  6 Sheets—Sheet 5.

J. T. RUSSELL.
HAY PRESS.

No. 508,843.  Patented Nov. 14, 1893.

WITNESSES:  INVENTOR:
John T. Russell,
BY
ATTORNEYS (No Model.) 6 Sheets—Sheet 6.

J. T. RUSSELL.
HAY PRESS.

No. 508,843. Patented Nov. 14, 1893.

WITNESSES:
F. L. Durand
J. L. Coombs

INVENTOR:
John T. Russell,
by Louis Bagger & Co.
Attorneys

THE NATIONAL LITHOGRAPHING COMPANY,
WASHINGTON, D. C.

UNITED STATES PATENT OFFICE.

JOHN THOMAS RUSSELL, OF CARTHAGE, MISSOURI.

HAY-PRESS.

SPECIFICATION forming part of Letters Patent No. 508,843, dated November 14, 1893.

Application filed February 13, 1893. Serial No. 462,132. (No model.)

*To all whom it may concern:*

Be it known that I, JOHN THOMAS RUSSELL, a citizen of the United States, and a resident of Carthage, in the county of Jasper and State of Missouri, have invented certain new and useful Improvements in Hay-Presses; and I do hereby declare that the following is a full, clear, and exact description of the invention, which will enable others skilled in the art to which it appertains to make and use the same, reference being had to the accompanying drawings, which form a part of this specification.

My invention relates to improvements in presses, of that character or description in which two bundles of any proper fibrous material such as hay or cotton may be simultaneously compressed, the object being to provide a novel construction of the same whereby I secure important advantages with respect to simplicity and efficiency in operation.

The invention consists in the novel construction and combination of parts hereinafter fully described and claimed.

Figure 1:
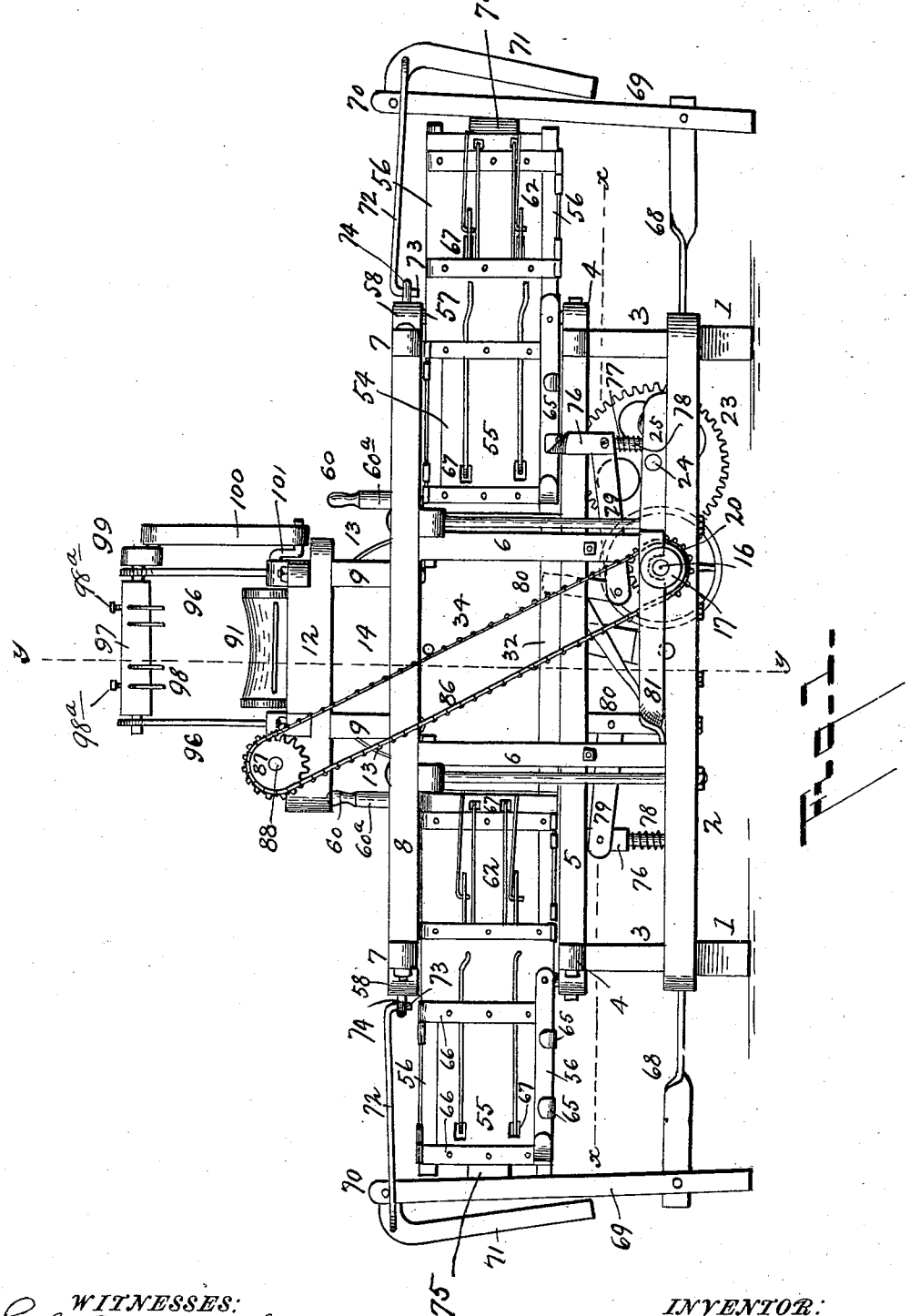
Figure 2:
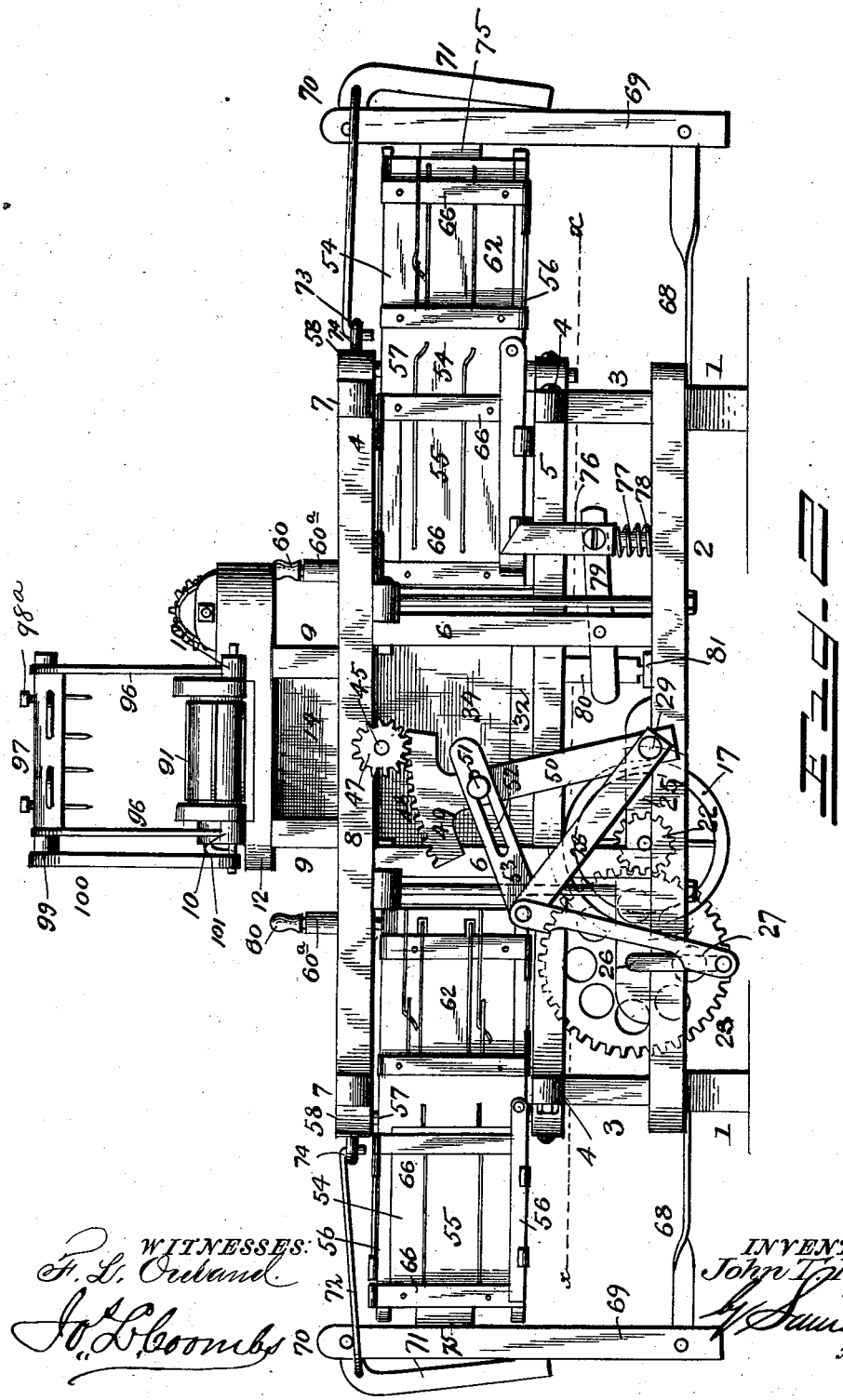
Figure 3:
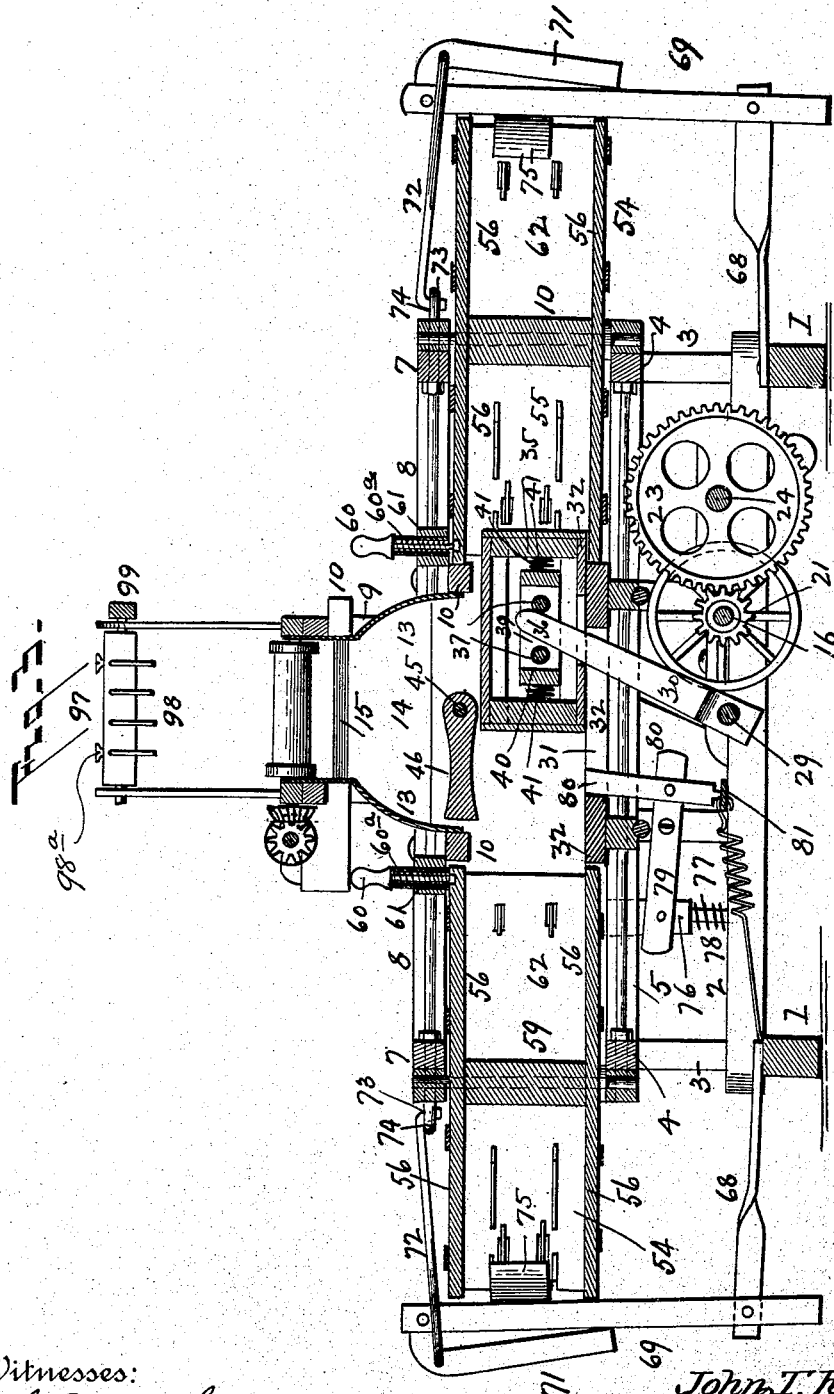
Figure 4:
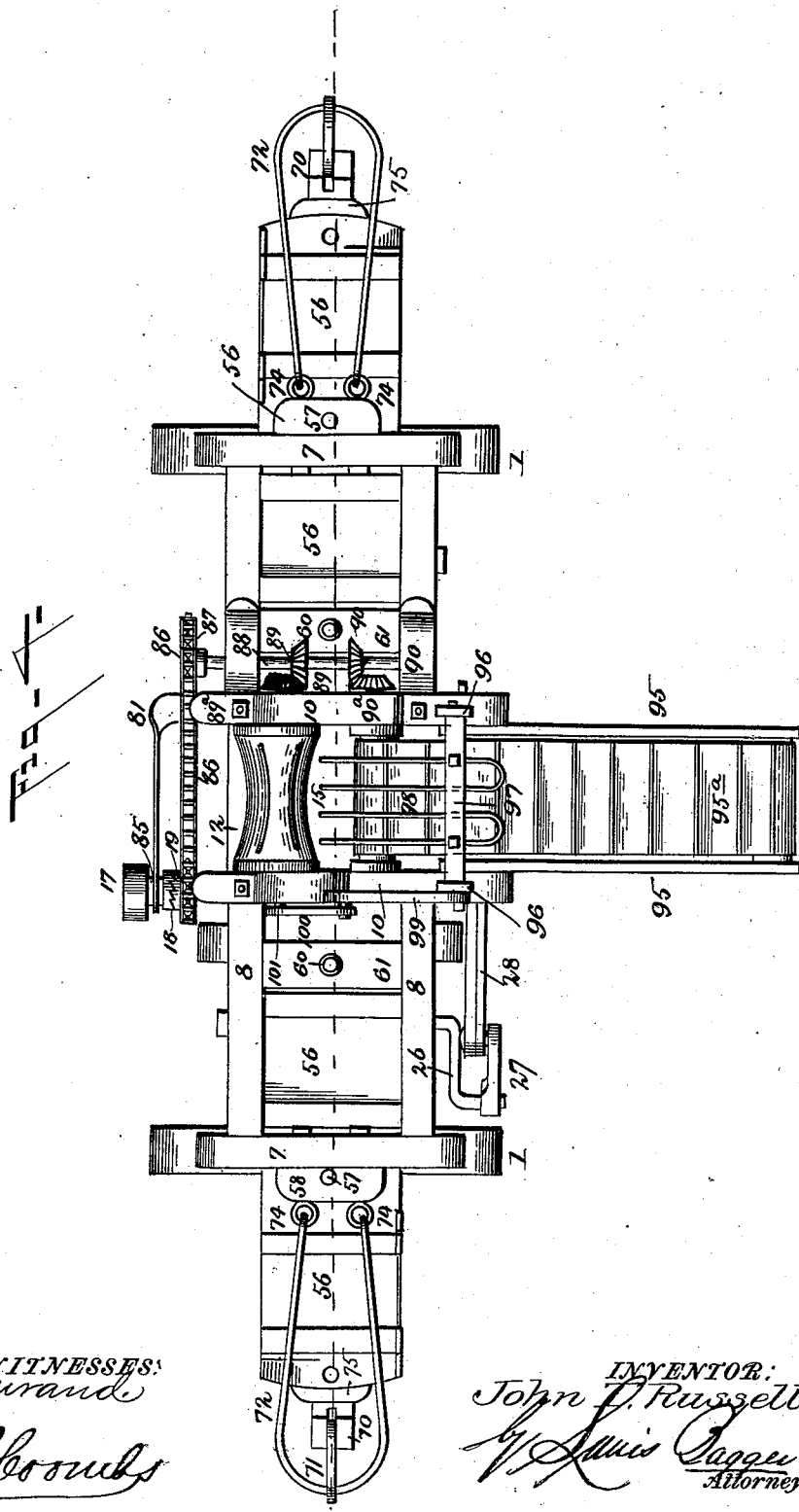
Figure 5:
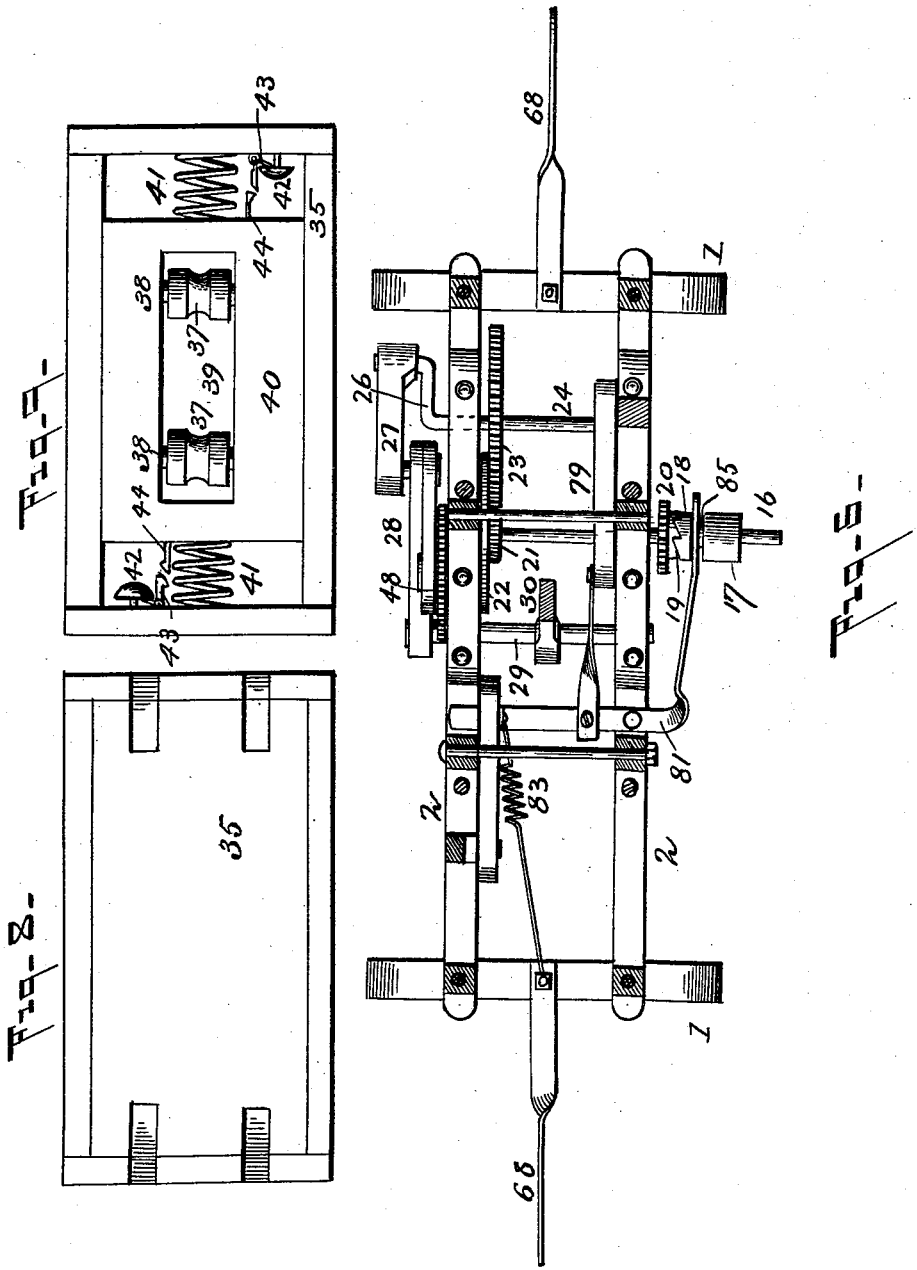
Figure 6:
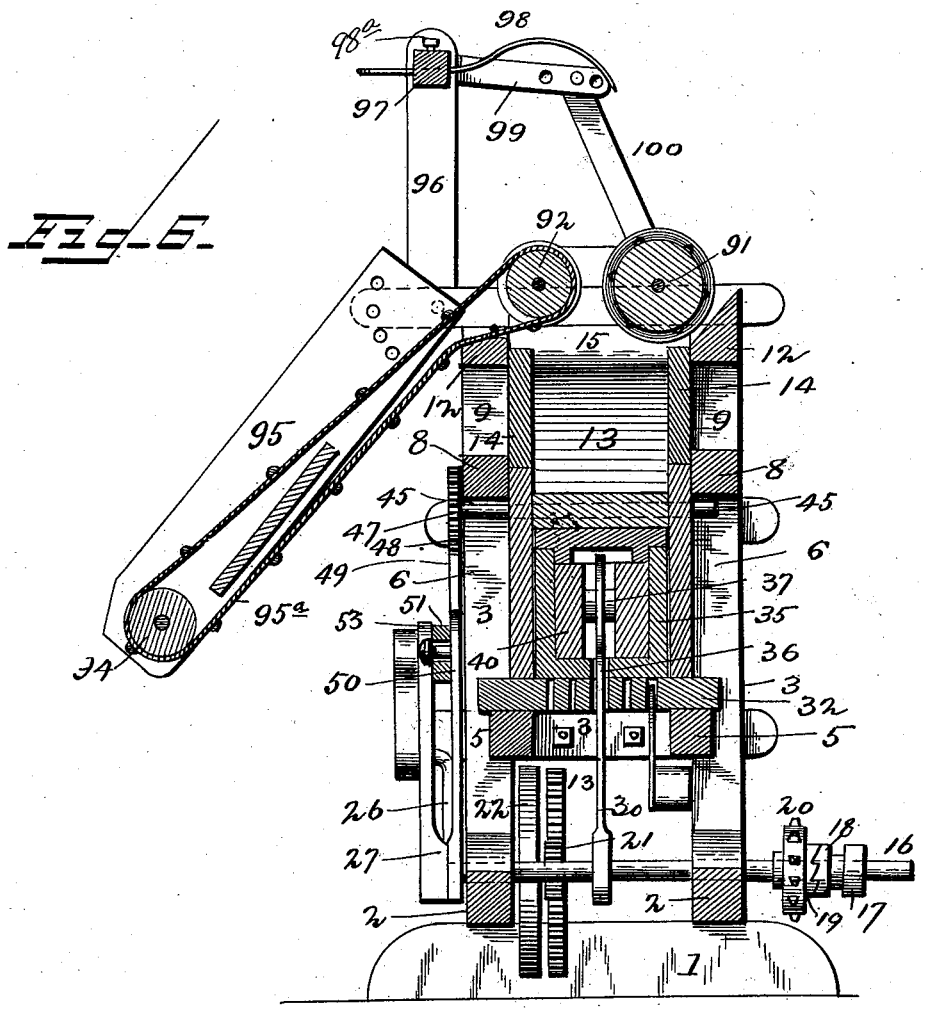
Figure 7:
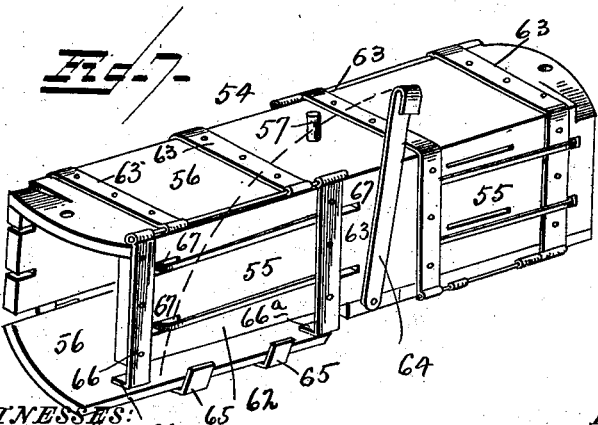

In the accompanying drawings: Figure 1 is a side elevation of a press constructed in accordance with my invention. Fig. 2 is a similar view, looking from the opposite side. Fig. 3 is a longitudinal section of the same. Fig. 4 is a plan view. Fig. 5 is a horizontal sectional view on the line $x$—$x$, Fig. 3. Fig. 6 is a central vertical section. Figs. 7, 8, and 9, are detail views.

In the said drawings, the reference numeral 1 designates two transverse base pieces which may be provided with wheels or rollers, so that the machine may be readily moved from place to place. Resting upon and secured to these base pieces are longitudinal stringers 2, provided at each end with uprights 3, which in turn support transverse beams 4, and longitudinal stringers 5. There are also intermediate uprights 6, which extend up above the stringers 5, and serve to support a rectangular frame, comprising cross-beams 7, and longitudinal stringers 8. The stringers 8 are provided with short posts 9, which support cross and longitudinal beams 10 and 12, which carry the elevating mechanism and the means for operating the same. The stringers 8 also carry an arc-shaped dome comprising the curved sides 13 and end plates 14, a central space 15 being left between the upper ends of said plates forming a feed-opening. This dome constitutes a feed-box to receive the material to be compressed from the elevator.

The numeral 16 designates the main driving-shaft journaled in bearings secured to the stringers 2, and is provided at one end with a loose driving-pulley 17, which at its inner end is formed with a clutch 18, which is adapted to engage with a corresponding clutch 19, formed with or secured to a fixed sprocket-wheel 20 on said shaft 16. Means, hereinafter described, are provided for actuating said pulley to throw the clutches into and out of engagement with each other. Intermediate of its ends, the shaft 16 is provided with a pinion 21 and a fly-wheel 22, the pinion meshing with a cog-wheel 23, fixed to a transverse shaft 24 journaled in bearings 25, secured to the stringers 2. This shaft has its end at the opposite side of the machine formed or provided with a crank 26 to which is pivoted a pitman 27. At its upper end this pitman is pivoted to a lever 28, the other end of which is secured to a transverse shaft 29, journaled in the stringers 2. This shaft 29, at or near its center is provided with an upwardly extending arm 30, which passes through a slot 31 in a plate 32 supported by the stringers 5. This plate or bottom with the vertical sides 34 forms a casing open at the ends and top within which reciprocates a rectangular plunger 35, having a slot 36, in its bottom through which the arm 30 projects, said arm passing between and engaging alternately with two rollers 37 journaled on transverse shafts 38, in a recess 39 in a block 14, located in said plunger. This block is somewhat shorter than its plunger, and a coiled spring 41 is interposed between each end thereof and the ends of said plunger. A gong 42 is contained in each end of the plunger, and is provided with a spring-hammer 43 adapted to be retracted by a projection 44 on the block, which on the continued forward movement of the block releases the hammer and sounds an alarm. As the springs 41, are made of a strength sufficiently great to stand up against the pressure of the material while being compressed, and to only give when the material has been compressed to the proper extent, it will be seen that this gong will not be sounded until the proper pressure has been applied, thus giving notice of the fact.

Located above the top of the plunger, and secured to a transverse-shaft 45, journaled in the sides 34 of the casing, is a striker 46 consisting of a rectangular plate, which alternately strikes the loose material carried into the dome by the elevator and presses it down in front of the plunger. This striker is operated by the following means: Secured to one end of the shaft 45, is a pinion 47, which meshes with a series of cogs 48, on a segment 49, formed on the upper end of a lever 50 journaled in the shaft 29. Near its upper end, the lever 50 is provided with a headed stud 51, which passes through a slot 52 in an arm 53 pivoted to the lever 28. By this construction, as the shaft 24 rotates, the crank 26 will actuate the pitman 27 and lever 28, causing the segment through the medium of the arm 53 and stud 51, to be intermittently moved back and forth, and the striker to be correspondingly oscillated.

The striker and plunger move oppositely to each other, that is to say, as the plunger recedes from the press box, and has about reached the end of its back-stroke, the striker operates so as to press the material down in front thereof, and by means of the slotted arm 53, the movements are so timed that the striker does not begin to strike and press the material until the plunger has about completed its stroke. As will hereinafter appear the plunger acts alternately to press the material in press boxes at each end of the machine, and the striker and plunger so operate with relation to each other, that as the plunger is compressing the material in one box, the striker is forcing the loose material down in front of the opposite press box to be compressed on the return stroke of the plunger.

In order to permit the continuous actuation of the plunger and to obviate the necessity for stopping while securing the compressed hay, &c., into a bundle, the baling compartments or press boxes are made removable, so that upon compressing the proper quantity of material in any one compartment, the said compartment or press box may be removed and an empty compartment or box substituted therefor opposite the end of the plunger casing, the last-named box or chamber being filled while the bale within the first-named box or chamber is being wrapped and tied. With this object in view, a baling-box 54 is pivoted opposite the open ends of the plunger-casing, and as said boxes on the opposite ends thereof, are similar in all respects, I shall describe but one of them, it being understood however, that the same description may be applied to both. The baling box 54 has a side wall 55, and top and bottom walls 56, the ends of said top and bottom walls, being arc-shaped and struck from a center in the center of the box through a vertical aperture at which point a pivot-bolt 57 passes, the said bolt also passing through boxes 58, secured to the cross-bars or beams 7. The rounded ends of the box thus formed are open, but the top and bottom walls thereof, are of a sufficient length to pass close to the correspondingly concaved faces of the end of the bottom 32 of the casing, and the cross-beam 10, thus making the baling-box a continuation of the plunger casing, when the former is in such a position on its pivot bolt, as to be in alignment with the latter. A transverse partition 59 extends across the middle of the box dividing it into two opposite compartments, either of which may be caused to register with the ends of the plunger casing by rotating the box upon the bolt 57, the box being adapted to be locked in position by means of a spring-depressed pin 60 working in a collar 60ª in a cross-bar 61, the said pin being adapted to enter either of two recesses in the top of the baling-box, one at each end, according to the position of the box. The opposite ends of the opposite side walls 55 of the baling chamber or box, are cut away and doors 62 are substituted therefor, the said doors being hinged to straps 63, secured to and passing half way around said box, said doors being adapted to swing upwardly and to be locked down by means of the pivoted catch 64, and the bent ends of straps 65 secured to the swinging bottoms. It will thus be seen that each compartment of the box, has a door on one side thereof for the removal of the bale and for convenience in reaching the latter and wrapping or tying it. The bottom of the box is also hinged to the straps 63, and the swinging doors are hinged with straps 66 which are bent inwardly forming hooks 66ª, which engage with the lower end of the door. When the catch 64 is turned down to lock the door and bottom, it lies between the bent ends of the straps 65, and presses the bent ends of straps 66 underneath the outer edge of the bottom, and thus securely holds the latter, and the door in a closed position. The side of the box opposite the door is provided with a number of slots 67, for the passage of the binding-wires, which also pass partly around the interior of the box and out between the edges of the partition and the door.

For the purpose of holding the bale in place, when the door and bottom are opened to allow the bale to be tied, I provide the following means: Secured to the base-piece 1 at each end, is an outwardly projecting arm 68, to which is pivoted an upwardly extending arm 69, having its free or upper end bifurcated, forming lugs 70, to which is pivoted a bent lever 71. To this lever is secured an inwardly extending yoke 72, consisting of a metal rod bent upon itself at the center, and having its ends bent at right angles, forming short arms 73, which are adapted to engage with eye-bolts 74, secured to the cross-beams 7. When the bale-box is turned upon its pivot, after a bale of hay has been compressed, the short arms 73 are engaged with the bolts 74, and the lever 71 turned down, which will cause the arm 69 to be moved forward, and the block 75 thereon, to be pressed tightly against the bale in the press box, and thus hold the same in place, when the door and bottom are opened. After the bale is wired a reverse movement of the lever or return to normal, will release the bale and allow it to fall to the ground.

For the purpose of automatically stopping the machine in case the press-box is not carried far enough to be properly aligned with the plunger after it has been turned on its pivot to present a new compartment to the action of the plunger, I provide the following means: At each end of the press-box is located a vertically movable block or shoe 76, having a shank 77 at its lower end which fits and works in an aperture in the stringer 2, a coiled spring 78, being interposed between the said block and stringer. The upper end of this block is rounded or beveled, and it is connected with a lever 79 pivoted intermediate of its ends to one of the posts or uprights 6. To the opposite end of this lever is pivoted an arm 80, which is adapted to be projected up through a slot in the bottom 32, in the path of the plunger. These arms are connected with one arm of a bell-crank lever 81, pivoted to one of the stringers 2. It will be noticed that one of the arms 80 is connected directly with the said lever below its pivotal point, while the other arm is connected above its pivotal point with an auxiliary arm 82, which is connected with said lever. By this means the lever is actuated in the same direction, no matter which of the said arms the plunger strikes. A coiled spring 83 is connected with said lever and with one of the base pieces 1 to return the same to normal position. The opposite end of said lever is provided with a notch 84 which engages with a peripheral groove 85, in the driving pulley 17. From this it will be seen, that as the press-box is turned to align it with the plunger, it will depress the block 76 actuating lever 79, causing the arm 80 to project up in the path of the plunger which will strike the same and operate the bell-crank lever to throw the driving-pulley out of engagement with the sprocket-wheel 20, and thus stop the machine.

Passing over the sprocket-wheel 20, is a sprocket chain 86, which also passes over a similar sprocket-wheel 87, fixed to a shaft 88 journaled in bearings secured to the beams 12. This shaft is provided intermediate of its ends with miter-gears 89 and 90, which mesh with similar gears 89ª and 90ª, secured respectively to the shafts of a feed-roller 91, and a roller 92, on the upper end of an elevating mechanism, consisting of two parallel side pieces 93, secured to the beams 10. A roller 94 is journaled in the lower ends of side pieces 95 journaled to the beams 10, and over these rollers passes an endless apron 95ª, by which the material to be baled, is elevated to the feed-dome. Secured to said beams 10 are two uprights 96 having a shaft 97 journaled in their upper ends. This shaft is formed with a series of holes or apertures in which are inserted radially adjustable curved fingers 98, which are secured in place by means of set screws 98ª. Secured to said shaft 97 is a crank 99, connected by means of a pitman 100 with a crank 101, on the end of the shaft of the feed-roller 91. It will be seen that as said roller is rotated the fingers 98 will be moved back and forth in such manner as to throw back on the elevating apron any excess of material carried thereby, and thus prevent it from being fed too fast, or in too great quantities to the feed-dome, and by being adjustable vertically the feed can be regulated according to the capacity of the machine.

The operation will be readily understood. The press boxes being properly aligned with the plunger and secured by means of the spring-actuated pin, motion is imparted to the driving-shaft, which through the medium of the sprocket-wheels, chain and connections will actuate the elevating apron, causing the material placed thereon to be carried up to the dome and be deposited therein through the feed-opening. In the meanwhile the striker by means of its pinion and the segment arm pivoted to the driving-shaft will be reciprocated back and forth through the medium of its connections, and will be oscillated beating and pressing down the material to be compressed alternately between the plunger and the press-boxes at each end thereof. While this operation is taking place, the plunger will be reciprocated back and forth, packing and compressing the material in the press boxes at each end of the machine. When the material has been compressed sufficiently to overcome the resistance of the coiled springs between the block and plunger, the block will move in said plunger and sound an alarm on the gong notifying the attendants. The press boxes are then turned so as to present a new compartment to the plungers and the lever 71 is then operated to press the block 75 on the arm 69 tightly against the bale which has just been compressed. The door and swinging bottom are now opened and the binding wires brought around the bale and their ends tied or secured together. The lever 71 is then returned to normal releasing the bale and allowing it to fall to the ground.

Having thus described my invention, what I claim is—

1. In a press the combination with a plunger and a pivoted baling or press box having oppositely opening compartments, and a hinged door and bottom, of the pivoted arm, the bent lever pivoted thereto, the yoke secured to said lever, and the press-block secured to said arm, substantially as and for the object described.

2. In a press, the combination with the pivoted baling box, having oppositely opening compartments, of the reciprocating plunger and means for operating the same, the feed-dome, the striker mounted upon a transverse shaft provided with a pinion, the segment arm pivoted or journaled on a transverse shaft and provided with a stud, the slotted arm in which said stud works, the pitman to which said arm is connected and the shaft and crank for operating said pitman, substantially as described.

3. In a press, the combination with the pivoted baling box having oppositely opening compartments, and the reciprocating plunger and means for operating the same, of the spring-actuated block or shoe having a beveled or rounded upper end, the pivoted lever connected therewith, the upwardly extending arm carried by said lever, the pivoted spring-actuated bell-crank lever connected with said arm and connected with a loose pulley on the driving-shaft, the sprocket-wheel and clutches, substantially as described.

4. In a press, the combination with a feeding-dome and a pivoted or swinging elevator or carrier, of the oscillating fingers for regulating the feed of the material carried by the elevator, substantially as described.

5. In a press the combination with a feeding dome and a pivoted or swinging elevator, of the oscillatory shaft formed with holes or apertures therein, the radially adjustable fingers for regulating the feed of the material carried by the elevator, passing through said holes, and the set screws for securing said fingers in place, substantially as described.

6. In a press, the combination with a feeding dome, the feed-roller and the swinging elevator or carrier, of the transverse shaft provided with miter-wheels, the miter-wheel on the shaft of the feed-roller, the crank at the other end of said shaft, the pitman and arm or crank connected with said shaft, the oscillating shaft and the vertically adjustable fingers carried thereby, substantially as described.

In testimony that I claim the foregoing as my own I have hereunto affixed my signature in presence of two witnesses.

JOHN THOMAS RUSSELL.

Witnesses:
SAML. MCREYNOLDS,
ORVILLE D. ROYSE.